Sept. 5, 1939.      R. D. AMSDEN      2,172,156
CONTROL CIRCUIT
Filed Sept. 20, 1938
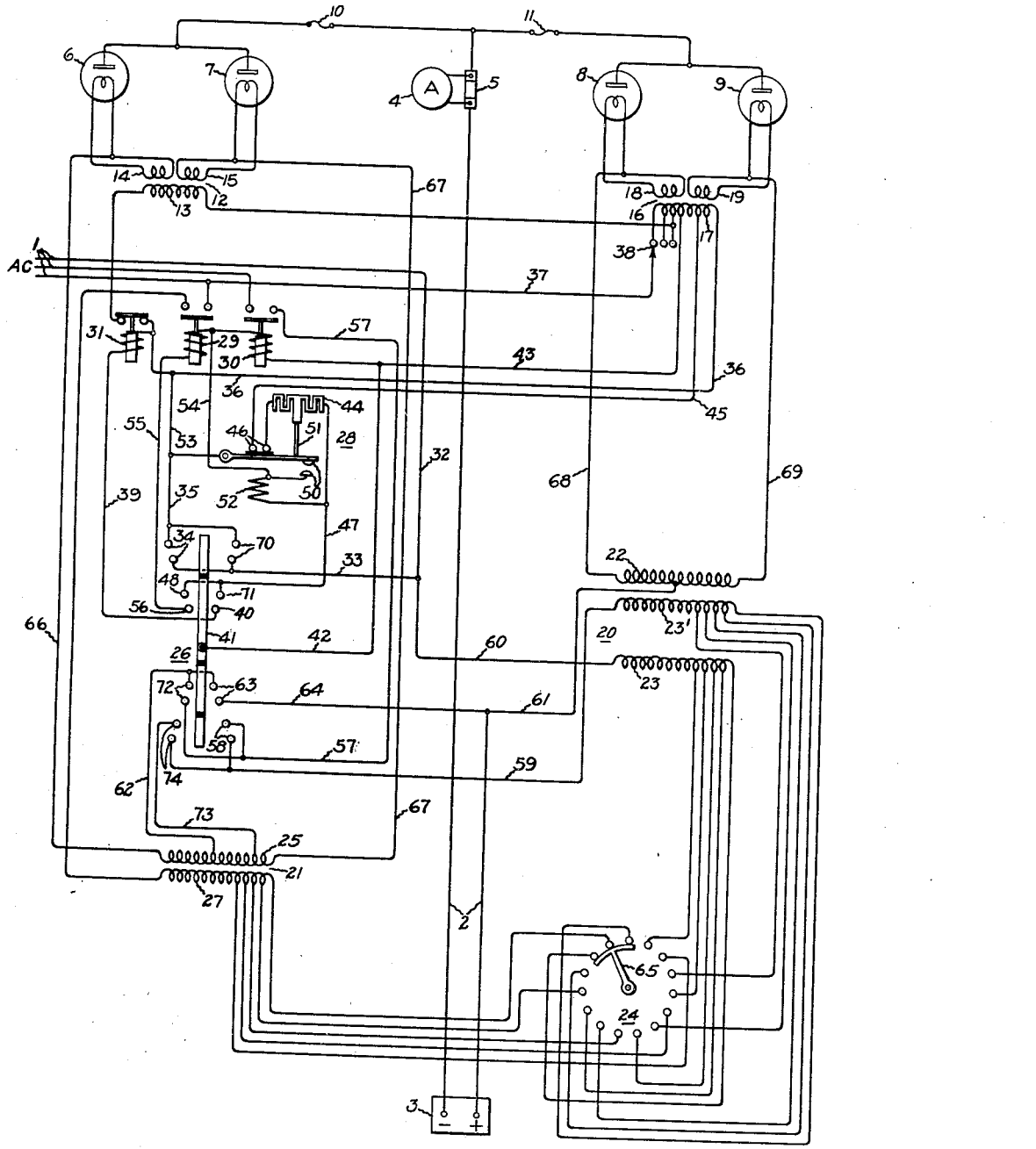
Inventor:
Ralph D. Amsden,
by Harry E. Dunham
His Attorney.

Patented Sept. 5, 1939

2,172,156

UNITED STATES PATENT OFFICE 2,172,156

CONTROL CIRCUIT

Ralph D. Amsden, Lynn, Mass., assignor to General Electric Company, a corporation of New York Application September 20, 1938, Serial No. 230,841

7 Claims. (Cl. 175—363)

This invention relates to electrical control circuits and more particularly to a new and improved rectifier control circuit for charging storage batteries.

It is desirable that battery charging rectifiers be capable of supplying widely variable, adjustable outputs because in most practical uses of such devices the number of batteries to be charged at any one time varies considerably.

In accordance with an important feature of this invention there is provided a new and improved battery charger which is characterized by a relatively wide range of adjustable output. This result is secured by the use of a T- or Scott-connected transformer which converts a three phase alternating current supply into a relatively smooth current by means of four half wave rectifiers when it is desired to secure a relatively high output and which is reconnected as a biphase rectifier using two half wave rectifiers and using a portion of the teaser transformer as a current limiting reactor when low outputs are desired.

An object of the invention is to provide a new and improved electrical control circuit.

Another object of the invention is to provide a novel wide-range rectifier circuit for battery charging service.

The invention will be better understood from the following description taken in connection with the accompanying drawing and its scope will be pointed out in the appended claims.

The single figure of the accompanying drawing illustrates diagrammatically an embodiment of the invention.

Referring now to the drawing, the main elements shown therein comprise a three-phase alternating current supply circuit 1 and a direct current load circuit 2 connected to a storage battery 3 which is to be charged therefrom. An ammeter 4 and shunt 5 are shown connected in the direct current load circuit. Four half wave rectifiers 6, 7, 8 and 9 are provided for rectifying the current supplied by circuit 1 and supplying this rectified current to the load circuit 2. These rectifiers may be of any suitable and well known type and are shown by way of example as conventional hot cathode electronic discharge type rectifiers. The anodes of the rectifiers 6 and 7 are connected to the negative side of the direct current load circuit through a protective fuse 10 and, similarly, the anodes of the rectifiers 8 and 9 are connected to the negative side of the direct current load circuit through another protective fuse 11. Tubes 6 and 7 are provided with a common cathode or filament heating transformer 12 having a single primary winding 13 and separate secondary windings 14 and 15 connected respectively to the cathodes of the two tubes. Similarly, tubes 8 and 9 have a common filament transformer 16 provided with a common primary winding 17 and individual secondary windings 18 and 19 connected respectively to the cathodes of the tubes.

The plate or anode supply for the rectifier tubes is obtained from a Scott-connected transformer arrangement comprising a main transformer 20 and a teaser transformer 21. The main transformer 20 has a secondary winding 22, the terminals of which are connected respectively to the cathodes of the rectifiers 8 and 9, and the electrical midpoint of which is permanently connected to the positive side of the direct current load circuit 2. This transformer is also provided with a primary winding having two sections 23 and 23' each of which is provided with a plurality of taps connected to contacts on a ratio adjusting switch 24. The teaser transformer 21 is provided with a secondary winding 25, the terminals of which are connected respectively to the cathodes of the rectifiers 6 and 7. Other connections of this secondary winding are controlled by a three-position master control switch 26 having an "off" position, in which it is illustrated, a "high" position when its movable contact member is rotated about its central pivot in a counterclockwise direction into contact with its fixed contacts and having a "low" position when it is turned in the opposite direction. The teaser transformer 21 is also provided with a primary winding 27 provided with a plurality of taps which are also connected, in a manner to be described later, to certain fixed contacts of the ratio adjusting switch 24.

A time delay relay 28 under the control of the master switch 26 is provided for delaying the application of anode voltage to the rectifier tubes for a predetermined time after the filaments of the tubes have been energized. A pair of relays 29 and 30 under the control of the time delay relay 28 control the energizing connections of the anode supply transformers 20 and 21. A third auxiliary relay 31 under the control of the master switch 26 controls the energization and deenergization of the filament transformer 12 for the rectifiers 6 and 7.

In general terms, the operation is as follows. When the control switch 26 is moved to its "high" position the filament transformer 16 will first be energized from the supply circuit 1. The primary winding 13 of the filament transformer 12 will be energized from across a portion of the primary winding 17 through the normally closed contacts of relay 31. The thermal relay 28 will also be energized from across a portion of the primary winding 17. After a predetermined time the thermal relay 28 will operate to energize the auxiliary relays 29 and 30. The closure of the relays 29 and 30 will connect the primary windings 23 and 23' of the main transformer 20 and the primary winding 27 of the teaser transformer 21 across the three phases of the supply circuit 1. The excitation of the main transformers 20 and 21 will cause their secondary windings to apply alternating potentials between the anodes and cathodes of each of the four rectifier tubes 6, 7, 8 and 9 and these devices will then act in the usual manner to permit only current to flow therethrough from their anodes to their cathodes. In this manner the three phase supply is in effect, transformed to a four phase supply which is rectified by the four individual rectifiers with the result that four pulses of unidirectional current are produced in the direct current circuit 2 during each cycle of the alternating potential of the supply circuit. By adjusting the switch 24 the voltage of the rectifier may be adjusted at will so as to provide any desired voltage and charging current for the direct current circuit 2.

When the main control switch 26 is moved to its "low" position, relay 29 is deenergized and relay 31 is energized. The energization of the relay 31 opens the cathode heating circuit for the rectifiers 6 and 7 and thus renders these rectifiers inactive. The deenergization of the relay 29 breaks the energizing connection between the primary winding 27 of the teaser transformer and the lowermost conductor of the supply circuit. At the same time the contacts on the switch 26 connect a portion of the secondary winding 25 of the teaser transformer in series with the primary windings 23 and 23' of the main transformer 20 across the two uppermost conductors of the supply circuit 1. In this manner the output of the rectifier is materially reduced in that it operates as a straight biphase rectifier using only the two rectifier tubes 8 and 9. During this operation the ratio adjusting switch 24 may be operated as before to adjust the output voltage of the rectifier.

A detailed description of the circuits and apparatus involved in the operation of the invention is as follows. Assume that the supply circuit 1 is energized by any suitable source of current supply (not shown) and that the switch 26 is moved in a counterclockwise direction from its illustrated "off" position to its contact making "high" position. This completes a circuit from the uppermost conductor of the supply circuit 1 through a conductor 32, a conductor 33, contacts 34, a conductor 35, a conductor 36 to the right hand end of the primary winding of the filament transformer 16. The other side of this primary winding is connected directly to the lowermost conductor of the supply circuit 1 through a conductor 37 and an adjustable contact 38 for adjusting the voltage of the filament transformer. The relay 31 is deenergized and its contacts are closed connecting filament transformer 12 in parallel with transformer 16.

The thermal relay 28 has a bimetallic heater element 44 which is energized from a tap on the primary winding 17 through a conductor 45, a set of contacts 46, the heater element 44, a conductor 47, contact 48, movable contact 41, conductor 42 and conductor 43 to another tap on the primary winding 17. After a predetermined time the current flowing through the heater element 44 causes sufficient heating for it to flex enough to close a set of contacts 50 by means of an arm 51 and at the same time open the contacts 46. Closure of the contacts 50 completes a holding circuit from a tap on the primary winding 17 through conductors 43 and 42, arm 41, contact 48, conductor 47, a holding coil 52 on the thermal relay, the contacts 50, a conductor 53, and conductor 36 to the right hand end of the primary winding 17. Thus, the holding coil 52 is energized and this maintains the contacts 50 closed against the action of the bimetallic element 44 tending to open these contacts as a result of cooling when it is deenergized by the opening of the contacts 46. The closure of the contacts 50 also completes an energizing circuit for the relay 29 from the right hand end of the winding 17 through conductor 36, conductor 53, contacts 50, a conductor 54, relay 29, a conductor 55, a contact 56, arm 41, conductor 42 and conductor 43 back to an intermediate tap on the winding 17. Closure of the relay 29 connects the outer terminal of the teaser primary 27 directly to the lowermost conductor of the supply circuit 1. Closure of the contacts 50 also completes an energizing circuit for the relay 30 from the right hand end of winding 17 to conductor 54, as before, then through relay 29 and back to winding 17 through conductor 43.

Closure of the relay 30 connects the outer end of the primary section 23' of the main transformer 20 to the middle conductor of the supply circuit through a conductor 57, a set of contacts 58 on the main control switch and a conductor 59. The outer end of the primary section 23 of the main transformer is permanently connected to the uppermost conductor of the supply circuit through conductors 60 and 32. The electrical midpoint of the secondary winding 22 of the main transformer is permanently connected to the positive conductor of the direct current load circuit by means of a conductor 61. The electrical midpoint of the secondary winding 25 of the teaser transformer is connected to the positive side of the direct current load circuit by means of a conductor 62, contacts 63 and a conductor 64. The inner extremities of the primary sections 23 and 23' of the main transformer and the inner extremity of the primary 27 of the teaser transformer 21 are all connected together by means of a movable contact 65 on the ratio adjusting switch 24. The ratio changing switch is illustrated in its minimum voltage position.

The left hand terminal of secondary winding 25 of the teaser transformer is connected to the cathode of rectifier 6 by means of a conductor 66, while the right hand terminal of the secondary winding is connected to the cathode of rectifier 7 by means of a conductor 67. The left hand terminal of the secondary winding 22 of the main transformer is connected to the cathode of rectifier 8 by means of a conductor 68 and the right hand terminal of secondary winding 22 is connected to the cathode of rectifier 9 by means of a conductor 69.

The application of alternating half cycles of positive anode potential in the rectifiers 6 and 7 and the similar application of 90° phase displaced half cycles of positive anode potential to the rectifiers 8 and 9 causes these four rectifiers to operate in the conventional manner to supply direct current to the load circuit 2.

If it is desired to increase the voltage of the rectifier, the switch blade 65 is rotated in a counterclockwise direction. When operated in this direction its trailing end will leave the contact it is shown in engagement with at substantially the same instant that its leading end makes engagement with the next contact. As these two contacts are connected to adjacent points in the primary section 23', the motion of the switch blade 65 in a counterclockwise direction through an angle corresponding to the spacing between adjacent contacts will result in a slightly unsymmetrical operation in that the primary section 23' will be operated with slightly less turns than the primary section 23. If now the switch blade contacts move in a counterclockwise direction through an angle corresponding to the spacing between the next two sets of contacts, a portion of the primary winding 27 of the teaser transformer will be cut out of circuit and if the blade continues to rotate into an engagement with the next succeeding contact, a section of the primary section 23 will be cut out of circuit. In this position the operation will again be symmetrical and predetermined fractions of each of the primary sections will be open-circuited, thereby increasing the voltage output of the transformers. By further rotating the switch blade 65 sections of the windings 23', 27 and 23 will be successively cut out of circuit and in every third contact making position the operation will be symmetrical.

If now the main control switch 26 is moved to its "low" position the primary winding 17 will be energized as before through a set of contacts 70 which are in parallel with the contacts 34. However, relay 29 will be deenergized or will not be energized, as the case may be, because its circuit will be open at contact 56. Relay 31 will be energized from the winding 17 through the contacts 40 and 41. The holding circuit for the coil 52 will be interrupted when the switch blade 41 leaves the contact 48 and this will allow the thermal relay to reset and open its contacts 50 and close its contacts 46. The thermal element, however, will be energized through a circuit which is the same as the one already traced except that it is completed through a contact 71 and the switch blade 41 instead of through the contact 48 and the switch blade 41. After a predetermined time the relay 28 will time out, thereby closing its contacts 50 and opening its contacts 46. The closing of the contacts 50 will complete a holding circuit through the contact 71 instead of through the contact 48 as previously described. The closing of the contacts 50 will also energize the relay 30, as already described. The primary section 23' of the main transformer will now be connected to the intermediate conductor of the supply circuit through the relay 30, conductor 57, contacts 72 on the main control switch, conductor 62, a part of teaser primary winding 25, conductor 73, contacts 74 and conductor 59 to the primary section 23'. The primary section 23 being already permanently connected to the upper conductor of the supply circuit through the conductor 32, the primary sections will now be connected in series with each other and with a portion of the secondary 25 of the teaser transformer. With this connection the circuit operates at reduced output as only the rectifier tubes 8 and 9 are energized and the supply voltage is further limited by means of the section of the secondary winding 25 acting as a series reactor or choke in circuit with the primary sections 23 and 23'.

Adjustment of the output voltage can be obtained by switch 24, as already described, except that the engagement of the switch blade 65 with the contacts connected to the teaser primary 27 will have no direct effect.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In combination, a three phase alternating current supply circuit, a direct current load circuit, a transformer bank comprising a main transformer and a teaser transformer, rectifying means connected between the secondary winding of the main transformer and the direct current load circuit, additional rectifying means connected between the secondary winding of the teaser transformer and the direct current load circuit, and a control switch having a position for making a Scott connection between said transformer bank and said supply circuit and having another position for open circuiting the primary winding of the teaser transformer, connecting the primary winding of the main transformer in series with a portion of the secondary winding of the teaser transformer across one phase of said supply circuit and disconnecting the secondary winding of the teaser transformer from its rectifying means while maintaining the connection between the secondary winding of the main transformer and its rectifying means.

2. In combination, a main transformer having a primary winding provided with two similarly multi-tapped identical sections, a teaser transformer having a correspondingly multi-tapped primary winding, a three-phase supply circuit having three conductors connected respectively to terminals of said primary winding; and a ratio adjusting switch for selectively connecting taps on the winding of said teaser transformer to such taps on each of the sections of the primary winding of said main transformer that the active portions of said primary windings between their interconnected taps and the conductors of said three phase supply circuit are in the proper ratio to form a variable voltage Scott-connected transformer bank.

3. In combination, a three phase alternating current supply circuit, a direct current load circuit, a transformer bank comprising a main transformer and a teaser transformer, rectifying means connected between the secondary winding of the main transformer and the direct current load circuit, additional rectifying means connected between the secondary winding of the teaser transformer and the direct current load circuit, a control switch having a position for making a Scott connection between said transformer bank and said supply circuit and having another position for open circuiting both the primary and secondary windings of said teaser transformer and connecting the primary winding of the main transformer in series with a portion of the teaser transformer across one phase of said supply circuit, and means for adjusting the output voltage of said transformer bank independently of the position of said control switch.

4. In combination, a three-phase alternating current supply circuit, a direct current load circuit, a transformer bank comprising a main transformer and a teaser transformer, rectifying means connected between the secondary winding of the main transformer and the direct current load circuit, additional rectifying means connected between the secondary winding of the teaser transformer and the direct current load circuit, and a control switch having a high output position for making a Scott connection between said transformer bank and said supply circuit and having a low output position for connecting the primary winding of the main transformer across one phase of said supply circuit and disconnecting the primary winding of said teaser transformer from said circuit.

5. In combination, a three phase alternating current supply circuit, a direct current load circuit, a transformer bank comprising a main transformer and a teaser transformer, rectifying means connected between the secondary winding of the main transformer and the direct current load circuit, additional rectifying means connected between the secondary winding of the teaser transformer and the direct current load circuit, a control switch having a high output position for making a Scott connection between said transformer bank and said supply circuit and having a low output position for connecting the primary winding of the main transformer across one phase of said supply circuit and disconnecting the primary winding of said teaser transformer from said circuit, and tap changing means for adjusting the output voltage of said transformer bank independently of the position of said control switch.

6. In combination, a main transformer having a primary winding provided with two multi-tapped sections, a teaser transformer having a multi-tapped primary winding, and a ratio adjusting switch for selectively connecting taps on the winding of said teaser transformer to taps on each of the sections of the primary winding of said main transformer, said switch having a plurality of fixed contacts and a movable contact for selectively engaging said fixed contacts in groups of three, the contacts of each of said groups being connected respectively to taps on the primary winding of said teaser transformer and to taps on the two sections of the primary winding of said main transformer.

7. In combination, a supply circuit, a load device, a thermal time delay relay having a set of contacts for connecting said load device to said supply circuit, means for energizing said thermal relay whereby after a predetermined time of energization it closes said contacts and connects said load device to said supply circuit, an auxiliary set of contacts for deenergizing said thermal relay when it connects said load device to said supply circuit, and a holding coil for maintaining the first mentioned contacts of said relay closed after the deenergization of said thermal relay, said thermal relay producing an effect tending to open its first mentioned contacts when said relay is deenergized whereby deenergization of said holding coil will produce substantially instantaneous resetting of said thermal time delay relay.

RALPH D. AMSDEN.